Jan. 26, 1960
C. S. CARTER ET AL
2,922,939
POSITION CONTROL SERVOSYSTEM
Filed March 24, 1958
2 Sheets-Sheet 1
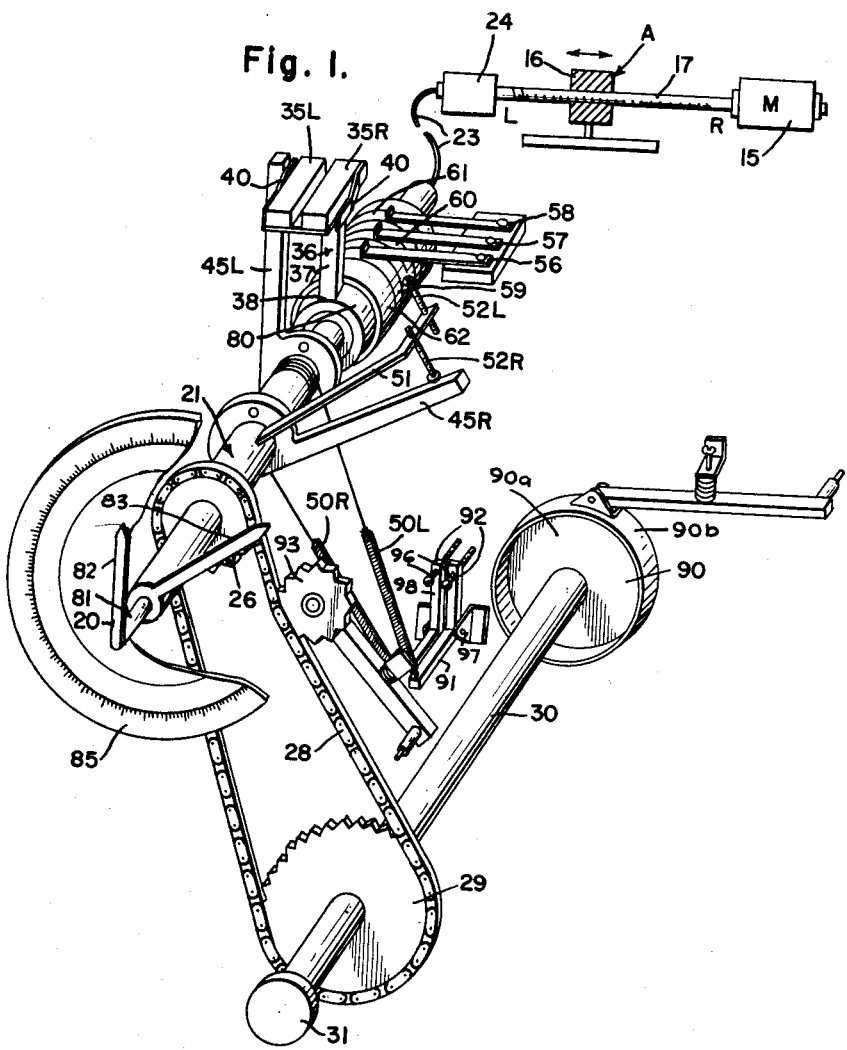
Fig. 1.
Fig. 5.
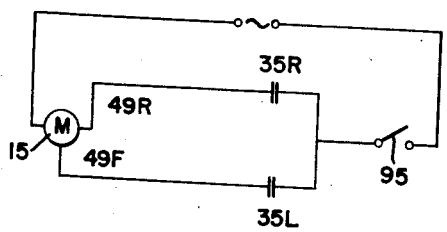
INVENTORS
George R. Oleson
Cecil S. Carter
BY
Townsend and Townsend
Attorneys

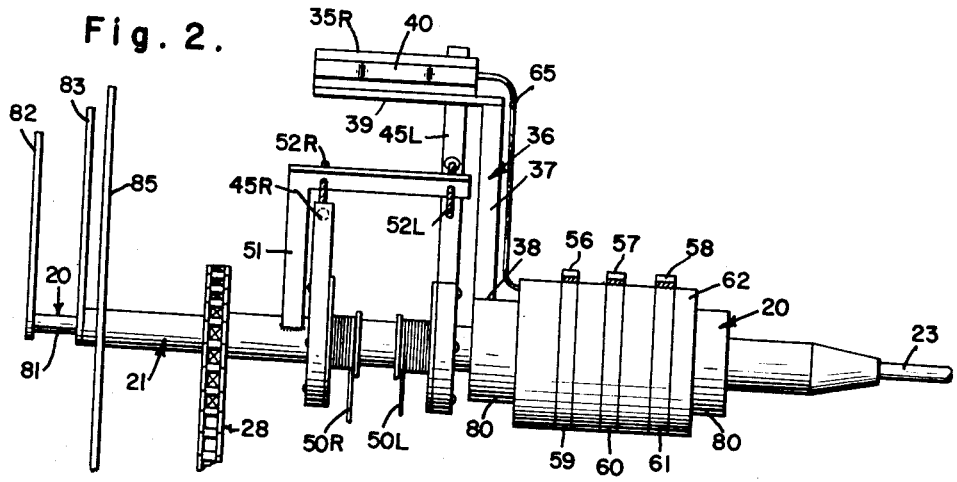
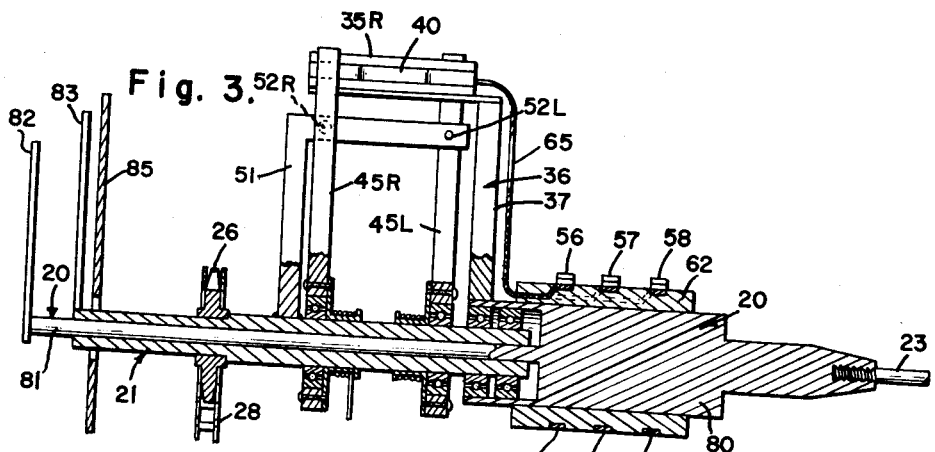
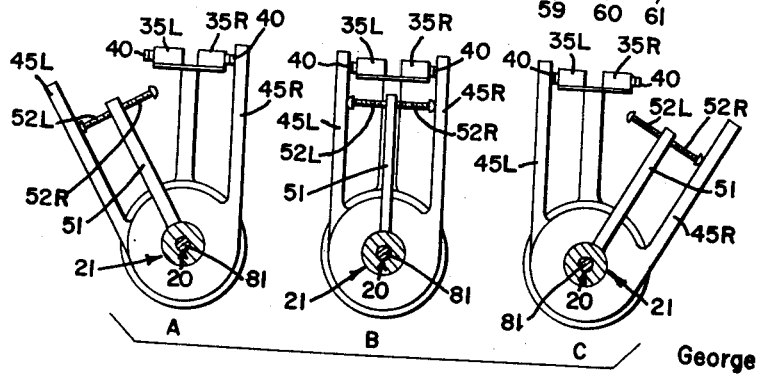

United States Patent Office 2,922,939
Patented Jan. 26, 1960

2,922,939
POSITION CONTROL SERVOSYSTEM

Cecil S. Carter and George R. Oleson, Medford, Oreg.

Application March 24, 1958, Serial No. 723,319

5 Claims. (Cl. 318—31)

This invention relates to a device to position an object or mechan.sm.

Many times it is desirable to position a device such as the guide mechanism of a saw or lathe or similar machinery at predetermined positions. For example, in a rip saw there may be a guide which is arranged to guide the board so that the blade will cut the boards in various dimensions when placed in particular positions such as for example the guide may guide a board to be cut in widths of ten inches, twelve inches, six inches or any other desired dimension.

A principal object of this invention is to provide a device which may be calibrated and set so as to cause the positioning of a mechanism such as, for example, the guide for a saw. Thus when the control mechanism is set to position the guide to cut a board to a two foot width, the guide mechanism will move to a position whereat a board of a two foot width will be cut.

Another object of this invention is to provide a device which will control the position of a mechanism in an analogue to the position of the control device so that an infinite selection of positions may be obtained.

A further object of this invention is to provide a position control mechanism which is operated on a servo principle so that the information as to the position of the mechanism to be controlled is fed directly back to the position control mechanism to create an electromagnetic feed back loop which functions to accurately and quickly adjust the position of the mechanism to be controlled.

Another feature of this invention is to provide a servomechanism which is operated solely by the positioning of microswitches and in the creation of a feed back servo loop so as to register microswitch actuating arms to actuate the microswitches to open and close electrical circuits which in turn cause the mechanism to be positioned to respond in such a manner so as to seek a predetermined position.

Other objects of the present invention will become apparent upon reading the following specification and referring to the accompanying drawings in which similar characters of reference represent corresponding parts in each of the several views.

In the drawings:

Fig. 1 is a perspective view of a principal embodiment of the invention.

Fig. 2 is an elevational view of a portion of the embodiment of Fig. 1.

Fig. 3 is a cross-section of Fig. 2.

Figs. 4A, B and C are diagrammatic views showing the position control mechanism in three different phases of operation.

Fig. 5 is a schematic view showing the circuit connection for the control mechanism of the invention.

The device to be controlled is generally indicated at A. The slave device comprises a motor 15 which is of the reversible type so that it may be driven in a forward or reverse direction in accordance with the terminal at which the voltage is applied.

The motor is arranged to position a guide 16 such as the guide for a table saw or the height of the guide of a planer or some other implement by rotating a worm gear 17 so that when the motor is driven in the forward or clockwise direction the guide will move to the right and when the motor is driven in a reverse or counterclockwise direction the guide will move to the left.

The principal object of this invention is to provide a control mechanism which will control motor 15 so as to position guide 16 at selected predetermined positions.

The mechanism to effectuate the control comprising the preferred embodiment of the invention is provided with two coaxially mounted shafts 20 and 21. Shaft 20 is connected by a direct linkage such as a speedometer cable as indicated at 23 to worm gear 17 so that the position of worm gear 17 directly controls the relative position of shaft 20. A reduction gear 24 may be interposed between worm gear 17 and speedometer in such a ratio that the full span of guide 16 from limit to limit will produce no more than a 360° rotation of shaft 20.

Shaft 21 is mounted coaxially over a portion of shaft 20 and is slidably engaged therewith. Shaft 21 is independently positionable by a sprocket and chain mechanism comprising a sprocket 26 nonrotatably fixed on shaft 21, a chain 28 engaged with sprocket 26 and positioned and controlled by a sprocket 29 which is mounted on a shaft 30. A control knob 31 is mounted on the end of shaft 30 by which the position of shaft 21 may be controlled. Thus coaxially mounted shafts 20 and 21 are independently positionable. Shaft 20 is positioned by the position of the worm gear 17, which is an analogue of the position of guide 16, and shaft 21 is positioned in accordance with the setting of control knob 31. Both shafts are arranged so as to have an operative radius of action slightly less than 360°.

A pair of microswitches 35R and 35L are mounted on a leg 39 of an L-shaped lever arm 36. The other leg 37 of the arm is rigidly mounted on the hub of shaft 21 as at 38. The microswitches are arranged each with an actuating member 40 which when depressed or forced against the body of the switch will cause the contacts of the switch to close but when in the normal position will cause the contact within the switch to be opened.

Two switch control arms 45R and 45L are mounted on shaft 21 to freely rotate about the shaft. Switch control arms 45R and 45L are registered upon shaft 21 so that arm 45R can rotate in a clockwise direction to a position to contact the switch actuating member 40 of switch 35R and control arm 45L is similarly arranged to rotate in a counterclockwise direction to operate control arm 40 of switch 35L.

Spring 50R biases arm 45R to rotate in the clockwise direction and arm 45L is biased by a spring 50L in the counterclockwise direction whereby both arms are biased to make continued operative contact with the actuating members of the two switches.

The two arms 45R and 45L are controlled by a switch control arm lever 51 rigidly mounted on shaft 21. Lever 51 is provided with two outwardly projecting spacer members 52R and 52L. The spacer members 52R and 52L are aligned with arms 45R and 45L and are spaced so that when lever 51 is in coplanar relation with the leg 37 of L-shaped arm 36 both control arms 45R and 45L will be spaced from switch actuating members 40 so that both switches 35R and 35L will be in their normal open position. Each spacer member is threadably adjustable so as to adjust for more accuracy or stability by either shortening or enlarging the spacing between the arms and the switches.

In the electrical circuit connecting the control apparatus to motor 15 the forward drive terminal 49F is connected to one terminal of switch 35L and the reverse terminal 49R of motor 15 is connected to one terminal of switch 35R. The opposite terminal of both switches 35R and 35L is connected to a common terminal for the power for the motor so that when switch 35L is closed the motor will turn in the forward or clockwise direction and move guide 16 to the right and when switch 35R is closed motor 15 will turn and guide 16 will move in the opposite direction. The contact of the wires from motor 15 to switches 35R and 35L is effected through three brushes 56, 57 and 58 which contact with slip rings 59, 60 and 61 respectively mounted on a dielectric sleeve 62 about the hub of shaft 20. The brushes are connected to the respective terminals of the switches via wires 65.

In operation it can be seen that when control lever 51 and arm 36 are aligned, as indicated in Fig. 4A, members 52R and 52L will maintain switch control arms 45R and 45L in spaced relation to switch control members 40 of switches 35R and 35L. Thus the switches will both be in their normal open condition and no power will be provided for motor 15. When knob 31 is turned, say for example to the right as indicated in Fig. 4C, lever 51 is moved to cause arm 45R to rotate in a clockwise direction while at the same time arm 45L is released so that the biasing force against arm 45L causes the arm to engage and close switch 35L. With switch 35L closed, motor 15 will be energized and turned in a clockwise or forward direction, guide 16 will move to the right and shaft 20 will turn in a clockwise direction. When shaft 30 turns clockwise arm 36 will turn in like manner. However, because arm 45L is biased to follow switches 35L, the switch will be maintained in the closed condition thus maintaining the circuit for motor 15 closed so that the motor will continue to operate. When arm 36 reaches the condition of alignment with lever 51 as seen in Fig. 4A spacer members 52L will stop arm 45L from following the switch whereby switch 35L will open and motor 15 will stop. If knob 31 is moved in a counterclockwise direction the opposite would be true. Switch 35R would be energized by pressure against actuating lever 40 by arm 45R thus causing motor 15 to be energized so as to move in the reverse direction or counterclockwise which causes guide 16 to move to the left until arm 36 has been turned to a home position with respect to lever 51.

The switches 35R and 35L have been described as normally open. However, the switches can be arranged to closed and members 52R and 52L can be arranged to contact with switches to hold the switches open when the device is in the home position as seen in Fig. 4A. Of course, the switches in such a case would be connected to the opposite terminals of the motor, i.e., switch 35R would be connected to the forward terminal 49F and switch 35L would be connected to the reverse terminal 49R.

Shaft 20 generally comprises an enlarged hub as indicated at 80 which carries the slip ring mounting sleeve 62. The forward end of shaft 20 is of substantially reduced diameter forming a long small diameter shaft portion 81 upon which shaft 21 is mounted slidably. The small diameter portion 81 of shaft 20 projects a short distance beyond a forward tip of shaft 21 and each shaft 20 and 21 has mounted on its forward tip an indicating needle 82 and 83 respectively. Behind the needle there is provided a dial 85 which is calibrated in the particular dimension desired. Thus when knob 31 is turned, indicator 81 will point to a desired position on dial 83 and motor 15 will then proceed to move in a direction until needle 82 is in a position coincident with needle 83. Thus the position of guide 16 may be moved to an infinite variety of positions within its limits of movement and the position will be an analogue of the positions of needles 82 and 83 with respect to indicator 85.

In that the position of shaft 21 is directly controlled by shaft 30 it is important, for accuracy, that the linkage between the two shafts 30 and 21 be free of play or slippage and that there be means to offer resistance to free rotation of shaft 30. A chain tensioning device incorporating a spring loaded sprocket 93 is employed to exert tension against a mid portion of the stretch of chain 28. By this means the effect of play or loss motion in the chain drive between shafts 21 and 30 is minimized.

A brake mechanism 90 is mounted on shaft 30 and employs a brake drum 90$^a$ with a brake band 90$^b$ around the drum. The band is under sufficient tension to offer sufficient resistance to rotational movement of shaft 30 to prevent the shaft from slipping or drifting by other than an intentional repositioning of the shaft by the intentional rotation of shaft 30 as by turning handle or knob 31.

Springs 50R and 50L are anchored to the arm 91 of an L-shaped spring tensioning device 92. The elbow of the tension device is pivotally mounted at 97 so that adjustment screw 96 mounted on the leg 98 of the device can be employed to rotate the tensioning device and shift the anchor of springs 50R and 50L to increase or decrease the spring tensioning.

It can be seen that this device may be used in any application where it is desired to position a guide or other such mechanism to selected positions between given points and is particularly useful where it is desired that the position of the guide be registered at a position remote from the guide and be controlled to move to selected calibrated positions by the mere positioning of an indicating needle to the analogue calibrated point on the dial.

It may be desirable to insert a switch 95 in series with the two switches 35R and 35L so that the operation of the motor may be controlled so as to start it sometime remote from the time that the indicator dial 85 is set. It is also obvious that bypassing switches could be used to manually actuate switches 35R and 35L so as to manually operate motor 15 without the positioning control regulation of the device. It may also be desirable to insert microswitches in series with motor 15 to function as limit switches for guide 16 so as to prevent guide 16 from traversing beyond the safe limits.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In a device for controlling the position of a mechanism the combination of: moving means for positioning the mechanism in a first and a second direction; circuit breaker means to cause said moving means to be at rest, to move in the first direction and to move in the second direction; means to move said circuit breaker between two points in an analogue of the position of said mechanism comprising a direct mechanical linkage connection interconnecting said mechanism and said circuit breaker; circuit breaker actuating means operable to control said circuit breaker means; and means to position said circuit breaker actuating means between two fixed points; said circuit breaker actuating means operable to actuate said circuit breaker in accordance with the relative position of said circuit breaker actuating means between the two fixed points and the circuit breaker between its two fixed points.

2. In a position control mechanism for controlling the movement of a device the combination of: two coaxially mounted independently rotatable shafts; electrical circuit breaker means rigidly mounted on one of said shafts; means for actuating said circuit breaker means rotatably mounted on one said shaft; means rigidly mounted on the other of said shafts to displace said circuit breaker actuating means from actuating engagement with said circuit breaker means when said shafts are in the first condition of relative alignment but not in the second condition of relative alignment; an electrical circuit to energize the device for movement; said circuit breaker means operable to control said electrical circuit; and a mechanical linkage connected between said device and one of said shafts to cause one shaft to rotate with the movement of the device.

3. In a control device for energizing an electrical circuit for causing the forward and reverse movement of a mechanism the combination of: a pair of coaxially mounted independently rotatable shafts; a mechanical linkage connecting one shaft with said mechanism to allow the shaft to rotate through less than 360° when said mechanism is moved between its limits of movement; means to independently adjustably set the position of the other shaft; a pair of oppositely facing electrical circuit breaker means connected to energize the electrical circuit rigidly mounted on one said shaft; one of said circuit breaker means operable to energize said circuit to cause the mechanism to move in a forward direction and the other of said electrical circuit breaker means operable to energize the electrical circuit to cause said mechanism to move in the opposite direction; means to actuate one said circuit breaker means and second means to operate the other circuit breaker means; said first and second means independently rotatably mounted on one of said shafts; means to bias said first and second means to rotate towards each other against each of the pair of oppositely facing circuit breaker means; and spacer means rigidly mounted on one said shaft between said first and second means and aligned therewith to cause said first and second means to be selectively spaced from actuating engagement from said circuit breaker means in accordance with the relative position of one shaft with respect to the other.

4. A control mechanism for switching electrical current to a device to cause the device to move comprising: two coaxially mounted independently rotatable shafts; means to rotate a first one of said shafts in an analogue of the movement of the device; means for independently rotating the other of said shafts; electrical circuit breaker means rigidly mounted on one of said shafts; first and second circuit breaker actuating means independently rotatably mounted on one of said shafts; means to bias said first circuit breaker actuating means to rotate in a clockwise direction in actuating contact with said circuit breaker means; means to bias said second circuit breaker actuating means to rotate in a counterclockwise direction to actuate said circuit breaker means from a position diametrically opposite the position of engagement of said first circuit breaker actuating means; and spacer means rigidly mounted on the shaft not carrying said circuit breaker means and between said first and said second circuit breaker actuating means and in engagement therewith to space said first and second circuit breaker actuating means to selectively cause said first and second circuit breaker means to be out of operative engagement with said circuit breaker means.

5. A control mechanism for switching electrical current to a device to cause the device to move comprising: two coaxially mounted independently rotatable shafts; means to mechanically rotate a first one of said shafts with the device to cause the shaft to rotate in an analogue of the movement of the device; means for independently rotating the other of said shafts and for locking the said other shaft in a fixed selected position; electrical circuit breaker means rigidly mounted on one of said shafts; first and second circuit breaker actuating means independently rotatably mounted on one of said shafts; means to bias said first circuit breaker actuating means to rotate in a clockwise direction in actuating contact with said circuit breaker means; means to bias said second circuit breaker actuating means to rotate in a counterclockwise direction to actuate said circuit breaker means from a position diametrically opposite the position of engagement of said first circuit breaker actuating means; spacer means rigidly mounted on the shaft not carrying said circuit breaker means and between said first and second circuit breaker actuating means and in engagement therewith to space both said first and second circuit breaker actuating means out of operative engagement with said circuit breaker when the two shafts are in a first selected position of alignment and to free one of said first and second circuit breaker means to move into operative engagement with said circuit breaker means when the two shafts are in other than the first selected position; and means to electrically connect said circuit breaker to said device to switch said device to move in a direction which will position the said shafts so as to move said spacer means toward the first position of relative alignment of the two shafts.

References Cited in the file of this patent
UNITED STATES PATENTS

| | | |
|---|---|---|
| 2,453,106 | Yardney et al. | Nov. 2, 1948 |
| 2,682,628 | Jordan | June 29, 1954 |
| 2,861,235 | Chadowski et al. | Nov. 18, 1958 |